(12) United States Patent
Perkinson

(10) Patent No.: US 8,770,934 B2
(45) Date of Patent: Jul. 8, 2014

(54) TEETER MECHANISM FOR A MULTIPLE-BLADED WIND TURBINE

(75) Inventor: Robert H. Perkinson, Somers, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 1102 days.

(21) Appl. No.: 12/639,027

(22) Filed: Dec. 16, 2009

(65) Prior Publication Data

US 2011/0142627 A1 Jun. 16, 2011

(51) Int. Cl.
*F01D 5/18* (2006.01)
*F01D 7/00* (2006.01)
*F03B 3/14* (2006.01)
*F04D 29/36* (2006.01)
*F01D 5/00* (2006.01)

(52) U.S. Cl.
USPC .............. 416/1; 416/102; 416/148; 416/133; 416/140; 416/168 R

(58) Field of Classification Search
USPC ...... 416/1, 102, 148–150, 133, 134 R, 134 A, 416/140, 141, 155, 164, 167, 168 R
See application file for complete search history.

(56) References Cited

U.S. PATENT DOCUMENTS

| | | | |
|---|---|---|---|
| 2,583,369 A * | 1/1952 | Fumagalli | 290/44 |
| 2,663,374 A * | 12/1953 | Vandermeer | 416/102 |
| 2,832,895 A * | 4/1958 | Hutter | 290/44 |
| 3,295,610 A * | 1/1967 | Frias | 416/137 |
| 4,111,602 A | 9/1978 | Barzda | |
| 4,201,514 A * | 5/1980 | Huetter | 416/37 |
| 4,348,155 A | 9/1982 | Barnes et al. | |
| 4,435,646 A | 3/1984 | Coleman et al. | |
| 4,556,366 A * | 12/1985 | Sargisson et al. | 416/155 |
| 4,557,666 A | 12/1985 | Baskin et al. | |
| 4,580,945 A * | 4/1986 | Miller | 416/134 A |
| 4,702,437 A * | 10/1987 | Stearns, Jr. | 244/17.11 |
| 4,792,281 A * | 12/1988 | Coleman | 416/156 |
| 4,815,936 A | 3/1989 | Stoltze et al. | |
| 5,354,175 A * | 10/1994 | Coleman et al. | 416/9 |
| 5,474,425 A | 12/1995 | Lawlor | |
| 5,573,463 A * | 11/1996 | Arlt | 464/90 |
| 5,584,655 A | 12/1996 | Deering | |
| 5,672,014 A * | 9/1997 | Okita et al. | 384/492 |
| 6,514,043 B1 * | 2/2003 | Rasmussen et al. | 416/134 A |
| 7,137,785 B2 * | 11/2006 | Van Egeren et al. | 416/147 |
| 7,528,497 B2 | 5/2009 | Bertolotti | |
| 2004/0096329 A1 * | 5/2004 | Engstrom | 416/132 B |
| 2005/0079053 A1 * | 4/2005 | Perkinson et al. | 416/98 |
| 2008/0272602 A1 * | 11/2008 | Kim et al. | 290/55 |
| 2009/0068012 A1 | 3/2009 | Bertolotti | |
| 2010/0021295 A1 * | 1/2010 | Perkinson et al. | 416/1 |

* cited by examiner

*Primary Examiner* — Edward Look
*Assistant Examiner* — Su Htay
(74) *Attorney, Agent, or Firm* — Carlson, Gaskey & Olds, P.C.

(57) ABSTRACT

A teeter mechanism for a multiple-bladed wind turbine includes a rotor shaft operable to rotate about a first axis. A spherical member is rotatable about the first axis along with the rotor shaft. A plurality of turbine blades is mounted to a rotor hub. The rotor hub rotationally drives the rotor shaft, and is operable to teeter about the spherical member such that the rotor hub rotates about the first axis in a first position and rotates about a second axis offset from the first axis in a second, teeter position.

22 Claims, 4 Drawing Sheets

TEETER MECHANISM FOR A MULTIPLE-BLADED WIND TURBINE

BACKGROUND OF THE INVENTION

This application relates to wind turbines, and more particularly to a teeter mechanism for a multiple-bladed wind turbine.

Wind turbines utilizing long turbine blades on the order of 50 meters (164 feet) or more have been used to generate electricity. Due to the length of such turbine blades, wind speed can vary greatly along the span of the turbine blades, in particular as a function of altitude from ground level. For example, a distal end of the turbine blade may experience significantly different wind speeds at lower and upper rotational positions.

This variation in wind speed, known as "wind shear," can cause the turbine blades to experience unequal loads on each blade. On wind turbines utilizing two blades, an offset pin on the rotor hub has been used to permit the blades to teeter such that an axis of rotation of the blades changes and the wind turbine experiences a more even load. However, this configuration is not effective for wind turbines having more than two blades.

SUMMARY OF THE INVENTION

A teeter mechanism for a multiple-bladed wind turbine includes a rotor shaft operable to rotate about a first axis. A spherical member is rotatable about the first axis along with the rotor shaft. A plurality of turbine blades is mounted to a rotor hub. The rotor hub rotationally drives the rotor shaft, and is operable to teeter about the spherical member such that the rotor hub rotates about the first axis in a first position and rotates about a second axis offset from the first axis in a second, teeter position.

In a second, separate embodiment a teeter mechanism for a multiple-bladed wind turbine includes a rotor shaft operable to rotate about a first axis and a yoke plate rotatable about the first axis along with the rotor shaft. A rotor hub is rotatable about the first axis in a first position and is rotatable about a second axis offset from the first axis in a second, teeter position. At least three turbine blades extend radially outward from the rotor hub. Each turbine blade has a pin and a base plate. Each pin extends from its corresponding base plate into an opening in the yoke plate, such that each base plate is operable to add or subtract pitch angle to its corresponding turbine blade as function of teeter angle.

A method of facilitating teeter in a wind turbine is also disclosed.

These and other features of the present invention can be best understood from the following specification and drawings, the following of which is a brief description.

DETAILED DESCRIPTION OF THE PREFERRED EMBODIMENT

Figure 1:
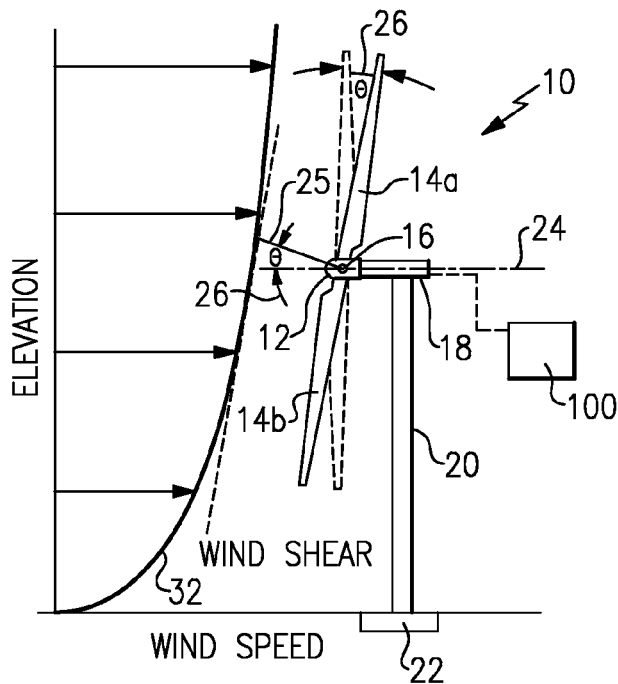
FIG. 1 schematically illustrates a prior art wind turbine.
Figure 1A:
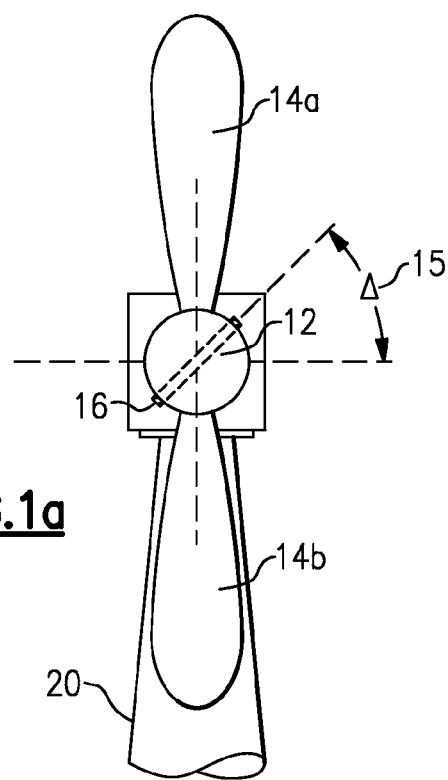
FIG. 1a schematically illustrates a rotor hub of FIG. 1, having two turbine blades.

FIG. 1 schematically illustrates a prior art wind turbine 10 that includes a rotor hub 12, a first turbine blade 14a, a second turbine blade 14b, a teeter pin 16, a nacelle 18, a tower 20 and a foundation 22 (see also FIG. 1a). The rotor hub 12 and turbine blades 14a-b rotate to drive an electric generator 100. The teeter pin 16 is located within the rotor hub 12 such that in a first position (see dotted lines), the turbine blades 14 rotate about an axis 24, and in a second, teeter position the turbine blades rotate about a second axis 25. A teeter angle 26 is defined between the axes 24, 25. The pin 16 may be offset by an angle delta 15 to couple a change in pitch to each blade in proportion to the teeter angle theta 26. The offset angle delta 15 is selected to provide a pitch change which will increase the angle of attack for the blade experiencing the lower wind speed. This provides a more even load on the blades 14a-b as they rotate through the wind field, and therefore even torque on the rotating hub. This reduces fatigue loading on the blades and attachments, which increases the life of the machine 10. However, this configuration is not effective for wind turbines having more than two blades.

Figure 2:
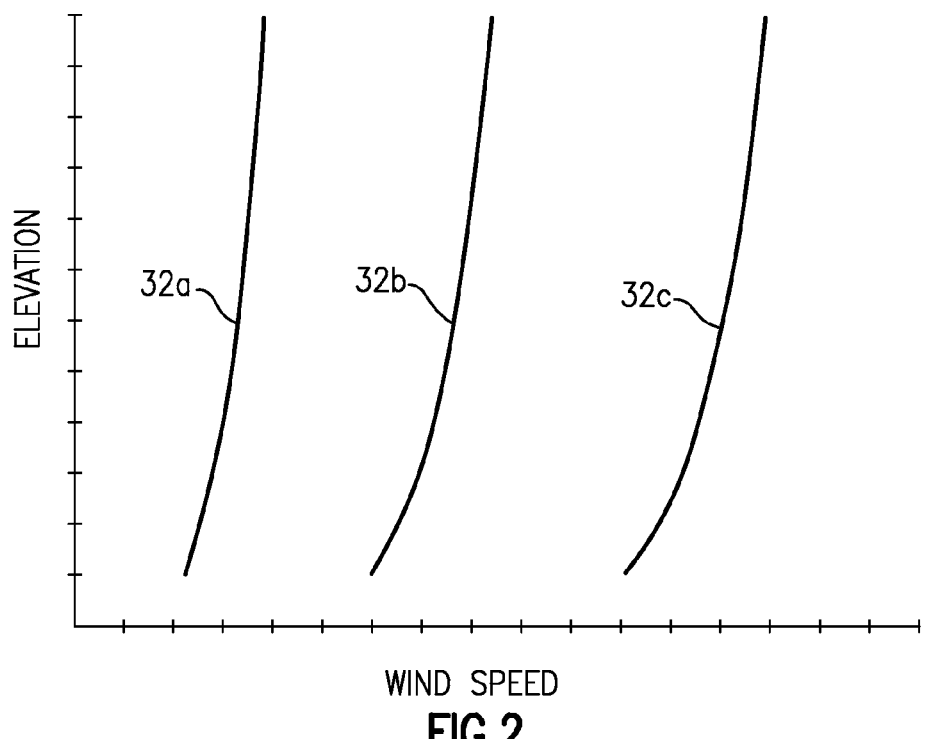
FIG. 2 is a graph of how wind speed can vary with elevation.

FIG. 2 is a graph of how wind speed can vary with elevation. FIG. 2 includes a plurality of wind profiles 32a-c. Each profile 32a-c demonstrates wind shear, as wind speed increases with elevation. Referring to FIG. 1, the teeter position of the wind turbine 10 enables the turbine blades 14 to experience a more even load when subjected to wind shear 32. However, the configuration of the wind turbine 10 is not effective for wind turbines having more than two turbine blades.

Figure 3A:
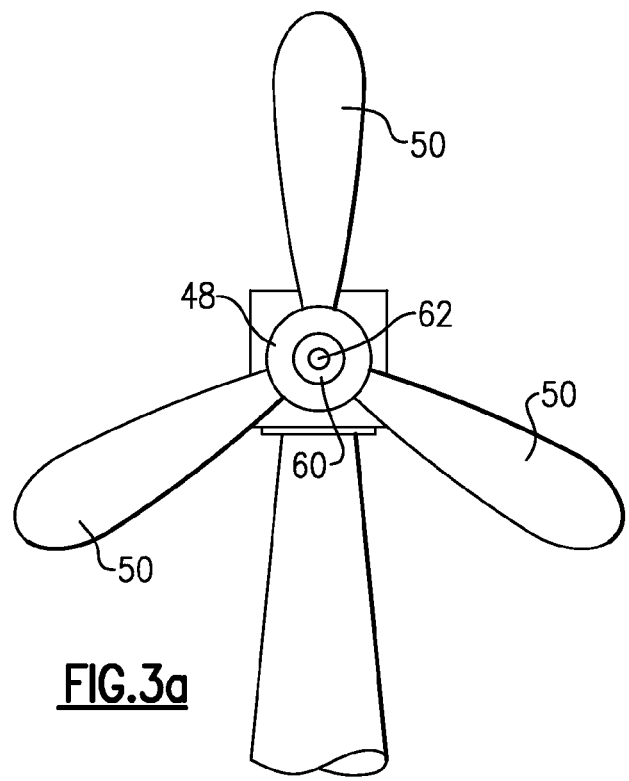
FIG. 3a schematically illustrates a rotor hub of FIG. 3, having three turbine blades.
Figure 3:
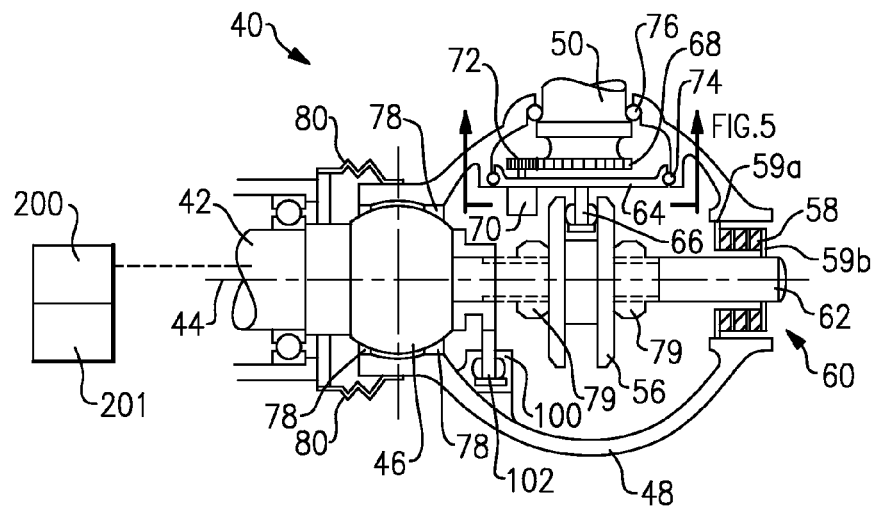
FIG. 3 schematically illustrates a teeter mechanism for multiple-bladed wind turbines in a first position.

FIG. 3 schematically illustrates a teeter mechanism 40 for multiple-bladed wind turbines in a first position. As will be described below, the teeter mechanism 40 can facilitate teeter in wind turbines having more than two turbine blades. A rotor shaft 42 is operable to rotate about a first axis 44. A spherical member 46 is fastened to the rotor shaft 42, and is operable to co-rotate about the first axis 44 along with the rotor shaft 42. A rotor hub 48 includes a plurality of radially extending turbine blades 50. Although only a single rotor blade 50 is shown in FIG. 3, it is understood that the rotor hub 48 could include three or more rotor blades (see, e.g., FIG. 3a).

The rotor hub 48 and turbine blades 50 rotationally drive the rotor shaft 42 to rotate about the first axis 44, to drive an electric generator 200. An pin and roller assembly 102 is secured to the spherical member 46. The pin roller 102 is received into a slot 100 in the rotor hub 48 such that when the turbine blades 50 are driven to rotate (e.g., by wind) the rotor hub corotates with the turbine blades 50, and the pin roller 102 received into the slot 100 corotates with the rotor hub 48.

Figure 4:
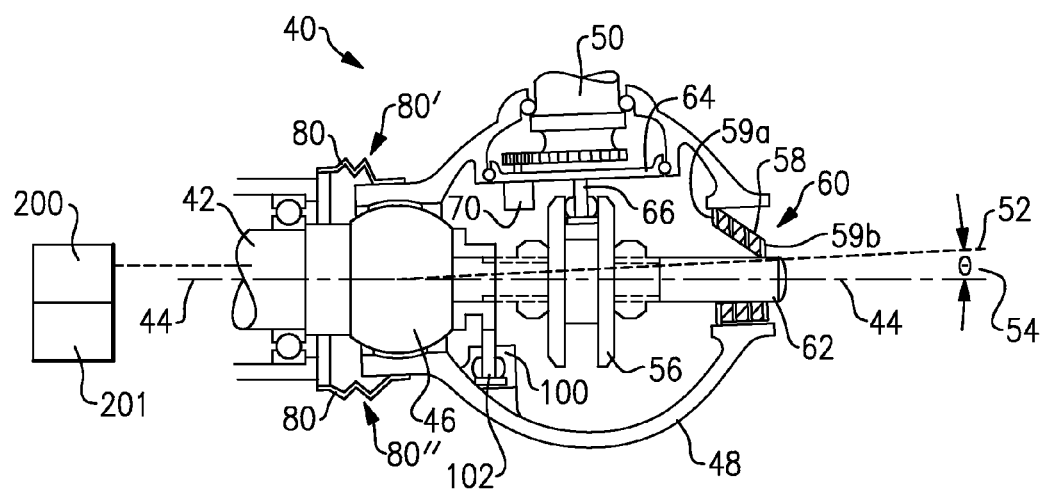
FIG. 4 schematically illustrates the teeter mechanism of FIG. 3 in a second, teeter position.

The rotor hub 48 and turbine blades 50 are operable to teeter about the spherical member 46 such that the rotor hub rotates about the first axis 44 in a first, non-teeter position (see FIG. 3) and rotates about a second axis 52 offset from the first axis in a second, teeter position (see FIG. 4). A teeter angle 54 indicates the amount of teeter experienced in the second position. The rotor hub 48 is operable to enter the teeter position (see FIG. 4) in response to wind shear. Although only a single second, teeter position is shown in FIG. 4, it should be understood that a plurality of second positions would be possible as the magnitude of the teeter angle 54 varies in response to differing wind shear conditions.

A plurality of wear-resistant bearings 78 are operable to facilitate the teetering without damaging the spherical member 46. An environmental shield 80 keeps out moisture and other environmental conditions from the spherical member 46. The environmental shield 80 is operable to expand and contract as required in the teeter position (see FIG. 4). Thus, as shown in FIG. 4, a portion 80' of the environmental shield has compressed, and a portion 80" of the environmental shield has expanded. In one example, the environmental shield 80 is made of an elastomeric material.

The teeter mechanism 40 includes a cylindrical yoke plate 56 and an annular elastomeric damper 58 that lines a cylindrical opening 60 at a front of the rotor hub 48. A plurality of nuts 79 secures the cylindrical yoke plate 56 to a fixed position along a center post 62. Nuts 79 may be used to position yoke 56 along axis 44 for the purpose of increasing or decreasing the amount of pitch change that results from teeter motion. A center post 62 extends through the cylindrical yoke plate 56 and is coaxial with the rotor shaft 42. The center post 62 also extends through the cylindrical opening 60. In the second, teeter position (see FIG. 4) the damper 58 limits an amount of teeter achieved by the rotor hub, as the center post 62 contacts a portion of the damper 58. In one example, the damper 58 is made of an elastomeric material, a first washer 59a extends from the rotor hub to the damper 58, and a second washer 59b extends from the damper 58 to the center post 62. In this example, the washers 59a-b provide a seal so that moisture, for example, does not enter an interior of the rotor hub 48. In one example the damper is compressed in the offset position (see FIG. 4).

Figure 5:
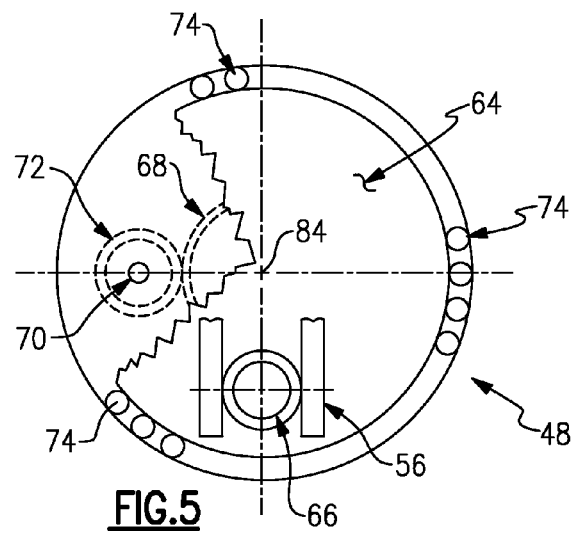
FIG. 5 schematically illustrates another view of the teeter mechanism of FIG. 3.

The teeter mechanism 40 also includes pitch control functionality for each of the plurality of turbine blades 50. A base plate 64 has a ridged pin and roller assembly 66 affixed to it in an offset manner, as shown in FIG. 5. The pin and roller assembly 66 has a sliding fit in the yoke plate 56. Gears 68 are included on an end of the turbine blade 50. An electric pitch change motor 70 is operable to apply torque to the gears 68 and base plate 64 by engaging the gears 68 to alter a pitch of the turbine blade 50 using gears 72. A controller 201 is operable to monitor a rotational speed of the rotor hub 48, and is operable to actuate the pitch change motor 70 to alter pitch in response to the rotational speed and other parameters such as wind speed.

As the turbine blade 50 rotates about the offset axis 52, the pitch of the turbine blade 50 could also vary as the pin 66 tilts within the cylindrical yoke plate 56, such that the pitch of the turbine blade 50 exhibits an oscillating small sinusoidal variation in pitch, completing one complete oscillation in each revolution of the blade 50. Thus, the pitch of the turbine blade 50 could undergo a cyclic change when the rotor hub 48 is in the teeter position. In one example, the pitch change motor 70 is controlled to set a desired pitch angle, but permits changes in pitch due to teeter within a predefined acceptable pitch variation range.

FIG. 5 schematically illustrates another view of the teeter mechanism 40 of FIG. 3. As shown in FIG. 5, the pin and roller assembly 66 is inserted into an opening in the cylindrical yoke plate 56, and the pin is offset from a center point 84 of the base plate 64. As described above, gears 72 on the pitch change motor 70 engage gears 68 of the turbine blade 50 to change a pitch angle of the turbine blade 50. A plurality of bearings 74 support base plate 64 and allow the turbine blade 50, which is centrifugally supported in hub 48 by a plurality of bearings 76 (see FIG. 3) to change pitch change by facilitating rotation of the base plate 64. In one example the bearings 74 include a ring of bearings placed along an entire circumference of the base plate 64.

Figure 6A:
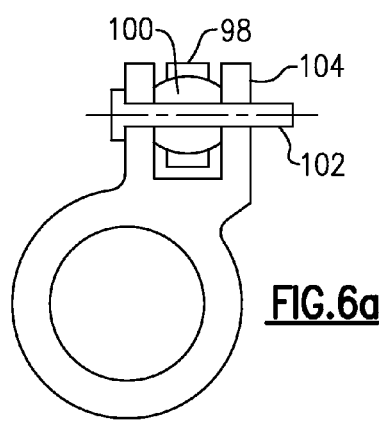
FIG. 6a schematically illustrates a portion of the configuration of FIG. 6 in greater detail.
Figure 6:
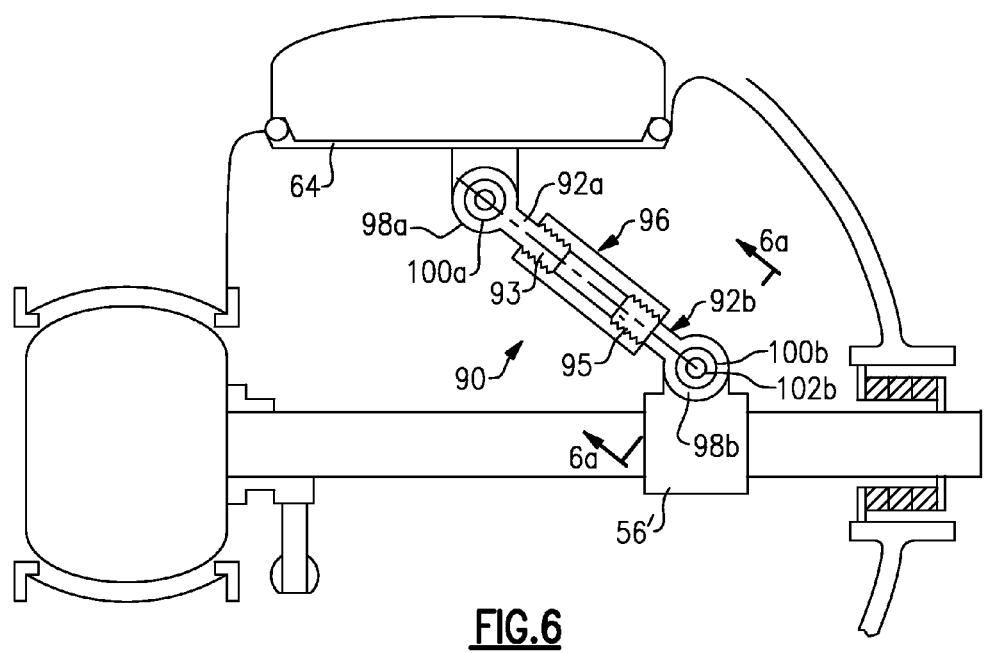
FIG. 6 schematically illustrates an alternate pin configuration for the teeter mechanism of FIG. 3.

FIG. 6 schematically illustrates an alternate embodiment of the pin 66 of FIG. 3 used to connect the base plate 64 to the cylindrical yoke plate 56. In the embodiment of FIG. 6, a pin 90 includes a first, spherical ball end joint portion 92a that extends from the base plate 64 and has an end 93 and an end portion 98a including a spherical bearing 100a; a second, spherical ball end joint portion 92b that extends from the cylindrical yoke plate 56' and has an end 95 and an end portion 98b including a spherical bearing 100b; and a third turnbuckle portion 96 that receives the spherical bearings 100a-b of the portions 92a-b. Each spherical bearing 100a-b is retained into a clevis 104 by a pin 102 (see FIG. 6a). The cylindrical yoke plate 56' may be smaller than the cylindrical yoke plate 56 of FIG. 3.

The embodiment of FIG. 6 can facilitate increased teetering. By increasing an amount of articulation available along the spherical member 46, the pin 90 can allow for more teeter magnitude (or "stroke") to be achieved without running out of room along the spherical member 46.

Although the teeter mechanism 40 has been described in the context of a wind turbine electric generator, it is understood that this is only an example application, and it is understood that the teeter mechanism 40 could be applied to other devices utilizing turbine blades rotating about a rotor shaft.

Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. A teeter mechanism for a multiple-bladed wind turbine, comprising:
   a rotor shaft operable to rotate about a first axis;
   a spherical member rotatable about the first axis along with the rotor shaft;
   a rotor hub for mounting a plurality of turbine blades to rotationally drive the rotor shaft, wherein the rotor hub is operable to teeter about the spherical member such that the rotor hub rotates about the first axis in a first position and rotates about a second axis offset from the first axis in a second, teeter position; and
   a pin roller fastened to the spherical member and received into a slot within the rotor hub, the pin roller being operable to translate rotation of the rotor hub to rotation of the rotor shaft.

2. The mechanism of claim 1, further comprising:
   an annular damper lining a circular opening at a front of the rotor hub; and
   a center post coaxially aligned with the rotor shaft, wherein in the second, teeter position the center post compresses a portion of the damper such that the damper limits an amount of teeter experienced by the rotor hub.

3. The mechanism as recited in claim 2, wherein the annular damper is attached at one axial end thereof to a first washer that extends from the rotor hub and at an opposed axial end thereof to a second washer that extends from the center post.

4. The mechanism of claim 1, further comprising:
   a plurality of base plates, each base plate corresponding to one of the plurality of turbine blades and being operable to rotate about an axis formed by its corresponding turbine blade to adjust a pitch of the corresponding turbine blade; and a plurality of pins, each pin corresponding to one of the base plates, and extending from its corresponding base plate into an opening of a yoke plate, such that the corresponding base plate is operable to add or subtract pitch angle to its corresponding turbine blade as function of teeter angle.

5. The mechanism of claim 4, wherein each pin extends from its corresponding base plate at a location offset from a center point of its corresponding base plate.

6. The mechanism of claim 4, wherein each pin includes:
a first portion that extends from its corresponding base plate and has a spherical end;
a second portion that extends from the yoke plate and has a spherical end; and
a third, turnbuckle portion that links the spherical ends of the first and second portions.

7. The mechanism of claim 1, further comprising:
a gear portion on each of the plurality of turbine blades; and
pitch change motor operable to engage the gear portion of each of the plurality of turbine blades to adjust a pitch of each of the plurality of turbine blades, wherein the pitch change motor is operable to permit independent changes in pitch due to teeter base plate rotation within a predefined range.

8. The mechanism of claim 1, further comprising an expandable/contractible environmental shield around the spherical member.

9. The mechanism as recited in claim 8, wherein the environmental shield is made of an elastomeric material.

10. The mechanism as recited in claim 1, wherein the spherical member is mounted at an end of the rotor shaft and is coaxial therewith.

11. The mechanism of claim 1, further comprising a wear-resistant bearing upon which the spherical member is mounted, the wear-resistant bearing being located between the spherical member and the rotor hub.

12. The mechanism as recited in claim 1, wherein the turbine blades are mounted on respective ones of a plurality of ring bearings such that the turbine blades are rotatable upon their respective ring bearings to change pitch.

13. A teeter mechanism for a multiple-bladed wind turbine, comprising:
a rotor shaft operable to rotate about a first axis;
a center post coaxially aligned with the rotor shaft;
a yoke plate adjustably secured on the center post such that an axial position of the yoke plate on the center post is variable, the yoke plate being rotatable about the first axis along with the rotor shaft;
a rotor hub rotatable about the first axis in a first position and rotatable about a second axis offset from the first axis in a second, teeter position; and
at least three turbine blades extending radially outward from the rotor hub, each turbine blade having a pin and a base plate, each pin extending from its corresponding base plate into an opening in the yoke plate, such that each base plate is operable to add or subtract pitch angle to its corresponding turbine blade as function of teeter angle.

14. The mechanism of claim 13, further comprising:
a spherical member rotatable about the first axis along with the rotor shaft, wherein the rotor hub teeters about the spherical member in the second, teeter position.

15. The mechanism of claim 13, further comprising:
an annular damper lining a circular opening at a front of the rotor hub; and
wherein in the second, teeter position the center post compresses a portion of the damper such that the damper limits an amount of teeter experienced by the rotor hub.

16. The mechanism of claim 13, wherein each pin extends from its corresponding base plate at a location offset from a center point of its corresponding base plate.

17. The mechanism of claim 13, wherein each pin includes:
a first portion that extends from its corresponding base plate and has a spherical end;
a second portion that extends from the yoke plate and has a spherical end; and
a third, turnbuckle portion that links the spherical ends of the first and second portions.

18. The mechanism of claim 13, further comprising:
a gear portion on each turbine blade; and
pitch change motor operable to engage the gear portion of each turbine blade to adjust a pitch of each turbine blade, wherein the pitch change motor is operable to permit independent changes in pitch due to teeter base plate rotation within a predefined range.

19. The mechanism of claim 13, further comprising a plurality of adjustable fasteners mounted on the center post adjacent axial sides of the yoke plate, the plurality of adjustable fasteners being adjustable to vary the axial position of the yoke plate on the center post.

20. The mechanism of claim 19, wherein the plurality of adjustable fasteners are nuts.

21. A teeter mechanism for a multiple-bladed wind turbine, comprising:
a rotor shaft operable to rotate about a first axis;
a yoke plate rotatable about the first axis along with the rotor shaft;
a rotor hub rotatable about the first axis in a first position and rotatable about a second axis offset from the first axis in a second, teeter position;
at least three turbine blades extending radially outward from the rotor hub, each turbine blade having a pin and a base plate, each pin extending from its corresponding base plate into an opening in the yoke plate, such that each base plate is operable to add or subtract pitch angle to its corresponding turbine blade as function of teeter angle;
a spherical member rotatable about the first axis along with the rotor shaft, wherein the rotor hub teeters about the spherical member in the second, teeter position; and
a pin roller fastened to the spherical member and received into a slot within the rotor hub, the pin roller being operable to translate rotation of the rotor hub to rotation of the rotor shaft.

22. A method of facilitating teeter in a wind turbine, comprising:
receiving a spherical member into a rotor hub, the rotor hub having at least three radially extending turbine blades;
receiving a pin roller fastened to the spherical member into a slot within the rotor hub, the pin roller being operable to translate rotation of the rotor hub to rotation of a rotor shaft;
rotating the rotor hub and plurality of turbine blades to rotationally drive the rotor shaft about a first axis; and
teetering the rotor hub about the spherical member such that the rotor hub and plurality of turbine blades rotate about a second axis, offset from the first axis, in response to wind shear.

* * * * *